Figure 1:
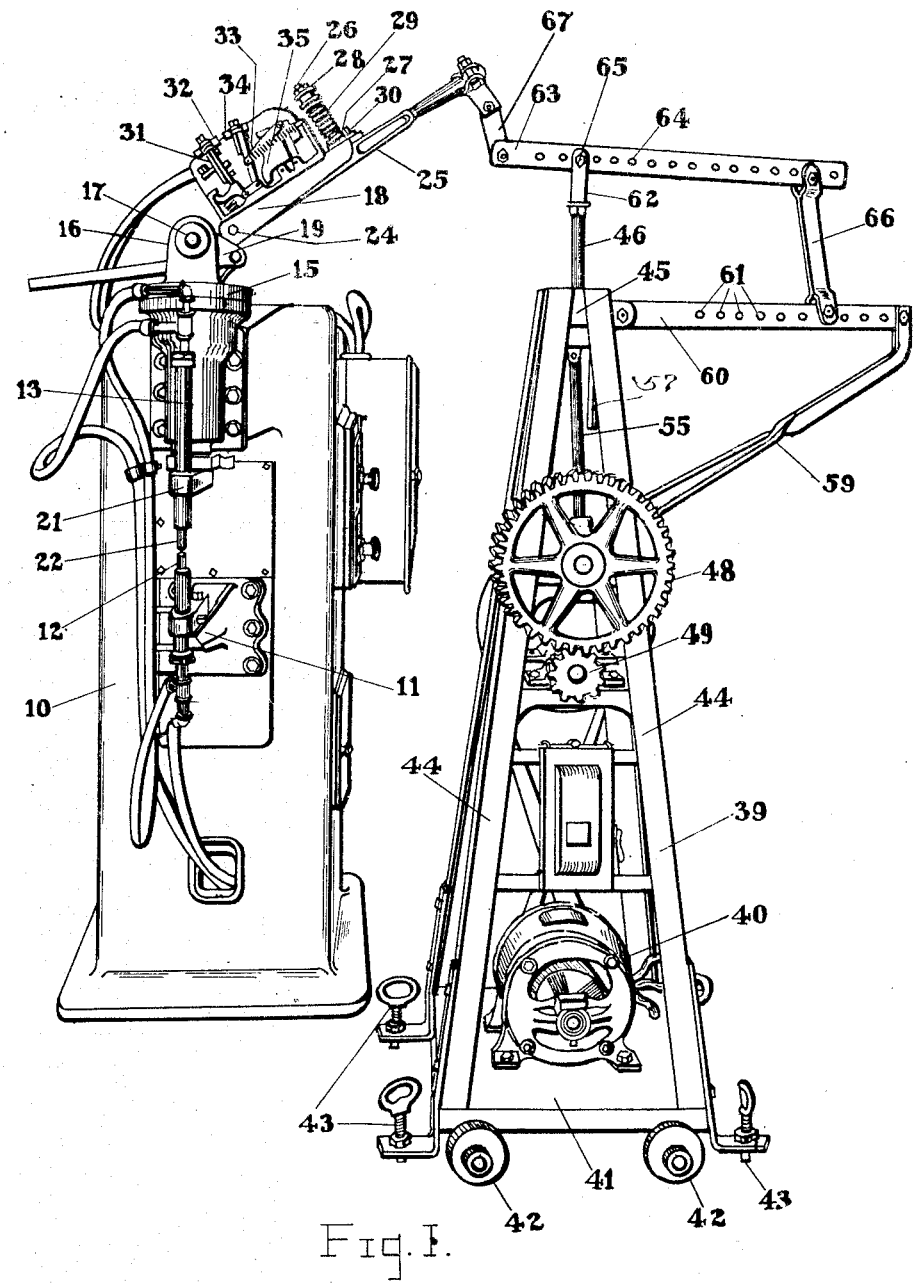

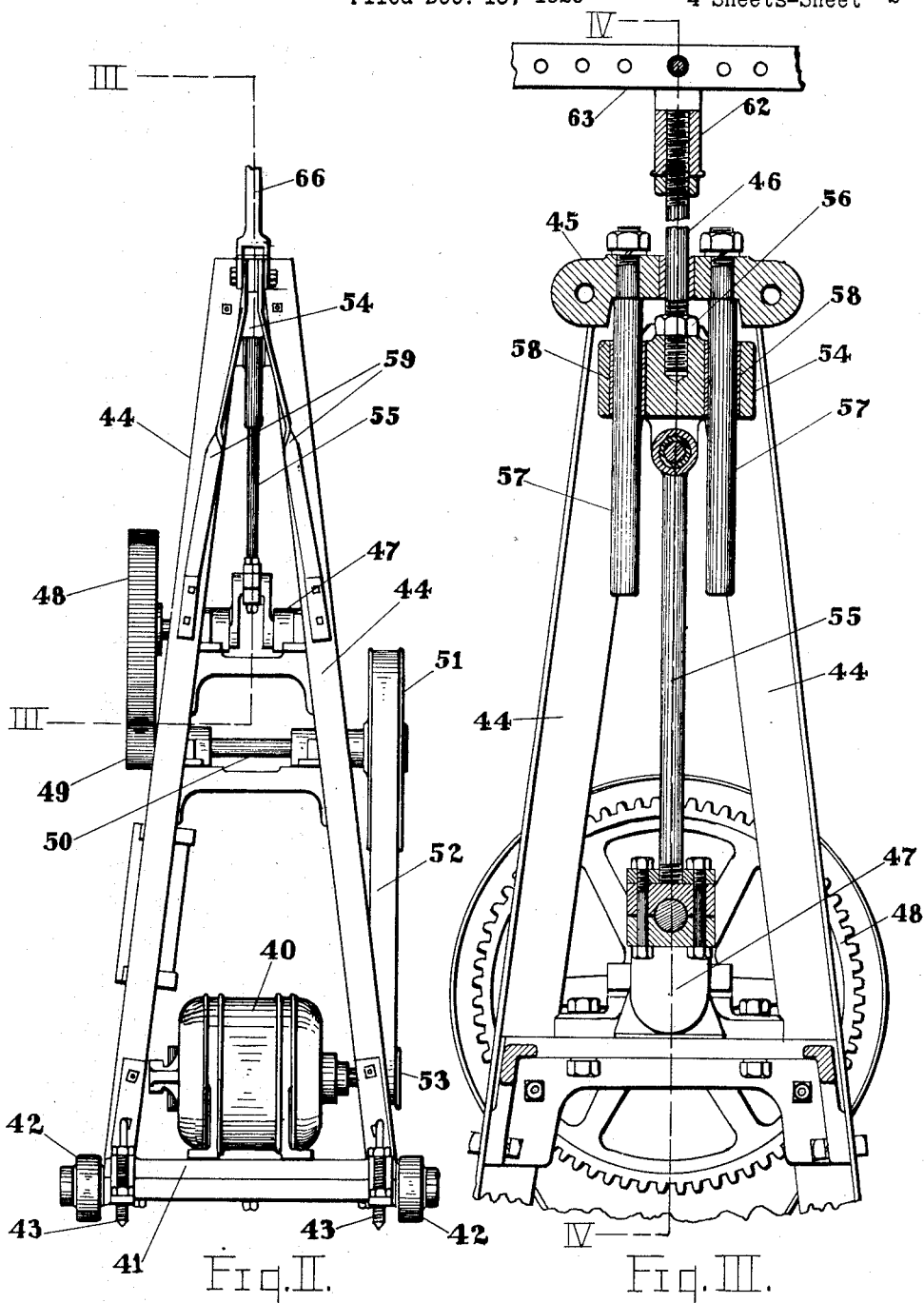

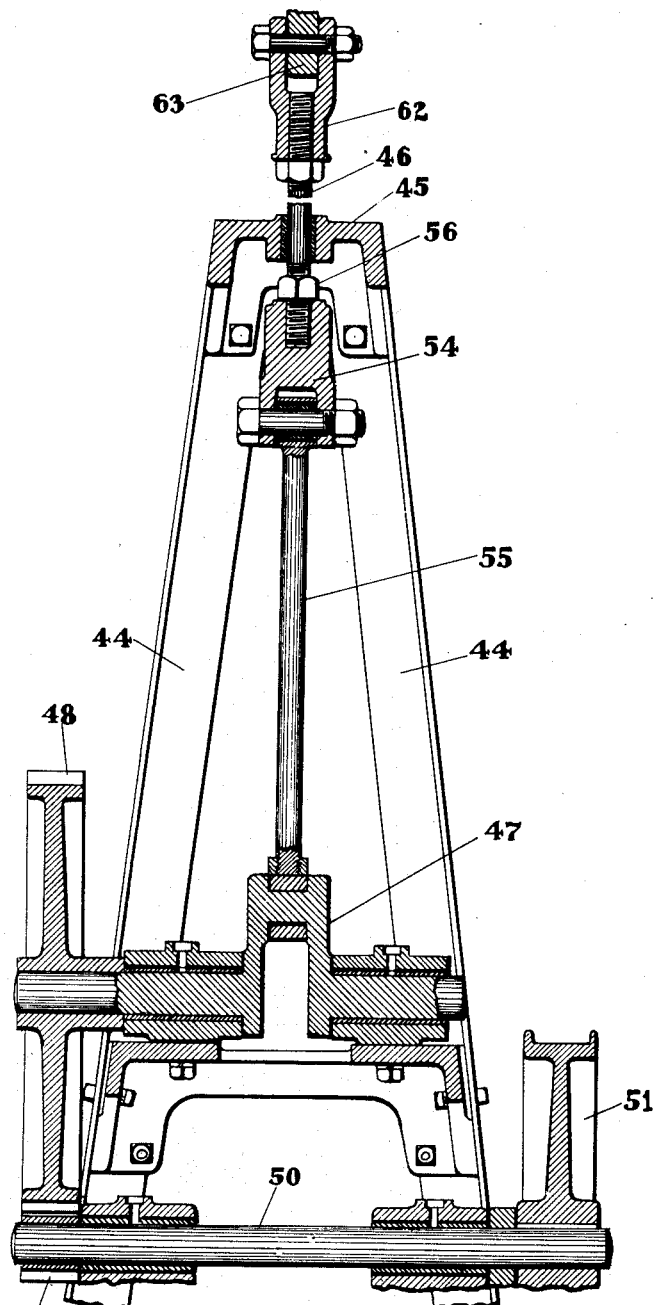

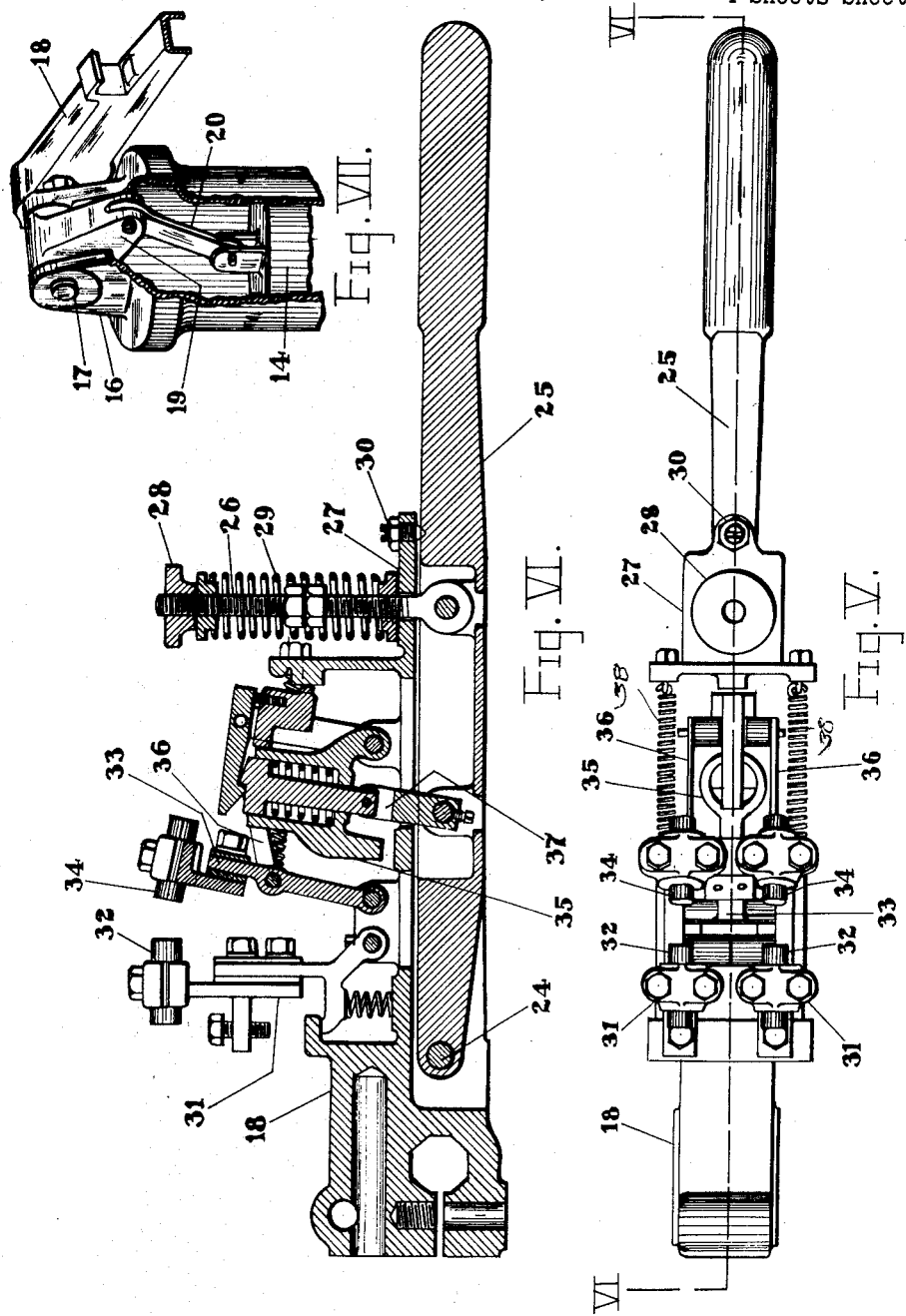

Patented Nov. 13, 1928.

1,691,486

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMATIC ELECTRIC WELDING MACHINE.

Application filed December 13, 1920. Serial No. 430,320.

My invention relates to improvements in automatic electric welding machines.

The principal object of my invention is to provide an electric resistance welder, which operates automatically to make a series of welds, either in one spot, a series of separated spots, or in spots overlapping each other, so as to form a seam weld, according to the placing or positioning of the work between the electrodes of the welder.

Another object of my invention is to provide an attachment which may be connected to an electric spot welding machine, so as to cause such machine to do seam welding.

Another object of my invention is to provide an electric welding machine, which is adapted to do seam welding upon work of irregular form and contour.

Another object of my invention is to provide an automatic attachment for electric welders which compensates for differences in thickness of the work and for wear in the electrodes.

Further objects, and objects relating to economies of production and details of construction, will definitely appear from the detailed description to follow: I accomplish the objects of my invention, in one instance, by the devices and means described in the following specification. My invention is clearly defined and pointed out in the appended claims. A structure constituting a preferred embodiment of my invention is illustrated in the accompanying drawing, in which:—

Fig. I is a view in front elevation of a machine embodying my invention.

Fig. II is a view, in side elevation, of a part of the automatic welding machine.

Fig. III is an enlarged sectional view taken on the line III—III of Fig. II.

Fig. IV is a detail sectional view taken on the line IV—IV of Fig. III.

Fig. V is a plan view of the actuating member of the welding machine.

Fig. VI is a sectional view on the line VI—VI of Fig. V.

Fig. VII is a view, partly in perspective and partly in section, showing the electrode actuating means.

In the drawings, similar reference numerals refer to similar parts throughout the several views, and the sectional views are taken looking in the direction of the section lines.

Welding machines, such as are in use at the present time, comprise, in general, a standard carrying a lower arm, which supports a lower fixed electrode, and an upper arm in which a plunger is suitably mounted. This plunger carries an upper and movable electrode, in line with and coacting with the lower fixed electrode. These two electrodes are suitably connected with a source of welding current, which may be, for example, the secondary of a transformer. The work is placed between the two electrodes and the plunger actuated to cause the movable electrode to approach the fixed electrode, so that a circuit is completed between the two electrodes and through the work. The resistance of the work to the passage of the electric current quickly raises it to such a temperature that the pieces of metal are welded together, at the point where pressure is applied by the electrodes. In one form of machine, the electrode is reciprocated by a lever fulcrumed on the upper end of the upper arm and connected with the plunger by a pair of links forming a toggle, so that a downward movement of the lever forces the plunger downwardly.

In one form of spot welder, which I have illustrated here, the actuating lever is made up of two parts joined together and held in alinement with each other by suitable springs so as to move as one part. This arrangement is such that, when the pressure exerted on the lever is sufficient to overcome the pressure of the springs, the parts of the lever move relative to each other and actuate a switch to close the circuit in which the electrodes are included. The result is that the welding circuit is not closed until the electrodes are applied to the work with a predetermined pressure. The instant of closing the welding circuit is not controlled by the relative movement of the electrodes, but by the pressure which they exert on the work, which, in turn, depends upon the thickness of the work and the degree to which the electrodes are worn.

In carrying out the objects of my invention, I provide mechanism which is connected with the lever of the welding machine, so as to rock it automatically and repeatedly. This mechanism may, in some instances, comprise a driven crank shaft to which a pitman is connected so that the pitman will be automatically reciprocated in its guide. This pitman may be connected by a system of links and levers with the lever of the welding machine, so that the reciprocation of the pitman acts to rock the lever on its fulcrum repeatedly. The links and levers connecting the pitman with the lever of the welding machine are so proportioned as to give the proper amount of movement to the actuating lever. If desired, the links and levers may be adjusted relative to each other, so as to vary the stroke. This arrangement makes a very convenient mechanism for securing the repeated rocking of the welding machine actuating lever.

In the drawings, I have illustrated one particular embodiment of my invention, which has given very satisfactory service and accomplished the desired results in a very satisfactory manner. The electric welding machine comprises the standard, 10, from which projects the lower arm, 11, which carries the lower fixed electrode, 12. An upper arm also projects from the standard, 10, similarly to the lower arm. At the outer end of the upper arm, there is mounted the guide block, 13, in which is slidably mounted the plunger, 14. At the upper end of this block, there is rotatably mounted the head, 15, which is provided with ears, 16, in which is journaled the pin, 17, on which the welder lever, 18, is mounted. Fixed on this pin is an arm, 19, which is connected by a link, 20, to the upper end of the plunger, 14. This arm and the link together form a sort of toggle, so that when the lever is actuated, the plunger is forced downward. On the lower end of the plunger there is fixed the block, 21, which carries the uper movable electrode, 22, in line with and cooperating with the lower electrode, 12. As I have stated, these two electrodes are connected in a circuit including the secondary of a transformer.

The lever, 18, carries a pin, 24, on which is fulcrumed the actuating lever, 25, which lies adjacent to the lever, 18, for a considerable portion of its length. The post, 26, is connected to the actuating lever, 25, and extends upwardly through an opening in the portion, 27, of the main lever, 18. A nut, 28, is threaded on the upper end of this post and a spring, 29, is compressed between this nut and the portion, 27. This spring tends to hold the main lever and the actuating lever in line with each other, with the actuating lever abutting the stop screw, 30. When the upper movable electrode meets with resistance to downward movement, as from the work, the pressure on the actuating lever acts against and overcomes the pressure of the spring, 29, so that the actuating lever, 25, rocks relative to the main lever, 18. Upon the main lever there is mounted a switch member, 31, having two contacts, 32, connected in circuit with the electrodes. A movable switch member, 33, is pivotally mounted on the main lever, 18, and carries two contacts, 34, which are adapted to engage the contacts, 32, so as to close the circuit which includes the electrodes. Means are provided whereby this is accomplished when the electrode meets sufficient resistance, so that the pressure of the spring, 29, is overcome and the actuating lever moves or rocks relative to the main lever. In general, such means comprise a rocking member, 35, pivotally mounted on the lever, 18, and connected by a link, 36, with the movable switch member, 33. The rocking member is connected with the actuating lever, by a link, 37, so that, when the actuating lever is moved out of alinement with the main lever, the rocking member, 35, is actuated and moves the switch member, 33, bringing its contacts, 34, into engagement with the contacts, 32, and closing the welding circuit. Springs, 38, may be provided for returning the parts to normal position. This specific construction does not form a part of my invention, but I have described it, because it is a typical construction by means of which the welding circuit is closed automatically when the proper amount of pressure has been applied by the electrode to the work.

The attachment, by means of which the electric welding machine is rendered automatic may be embodied in stuctures of a wide variety of forms. A simple arrangement is shown, which comprises a standard, 39, in the base of which is mounted a motor, 40. I find it very convenient to provide the base, 41, with castor wheels, 42, so that the standard can be moved from place to place, and with adjustable feet, 43, so that it can be fixed in any desired position. The standard may be very conveniently made by mounting angle bars, 44, on the base, 41, which converge upwardly and are fastened to the head, 45. A pitman, 46, is slidably mounted in a bearing in the head, 45, so as to reciprocate vertically. Reciprocatory movement may be imparted to the pitman in various ways. In the form shown, a crank shaft, 47, is journaled in the standard, 39, about midway between the base and the head, and the lower end of the pitman, 46, is connected to the arm of the crank shaft. A gear, 48, is mounted on the crank shaft, 47, and meshes with a pinion, 49, on the counter-shaft, 50. A pulley, 51. fixed on this counter-shaft carries a belt, 52, by which it is connected with the drive pulley, 53, of the motor, 40.

The lower end of the pitman, 46, is secured to a block, 54. The pitman is adjustable in the block, being threaded therein and locked in position by the nut, 56. The head, 45, carries guide pins, 57, which extend through bearing sleeves, 58, in the block, 54, and form guides, compelling the block and the pitman 46, to reciprocate in a vertical direction as the crank shaft rotates. The block, 54, is connected to the crank arm by the connecting rod, 55.

The laterally extending arms, 59, support the outer end of a bar, 60, the inner end of which is fastened to the head, 45, of the standard. A series of holes, 61, are formed in this bar. A forked member, 62, is adjustably fastened to the upper end of the pitman, 46, and a lever, 63, is pivotally connected to said fork member. This lever has a series of holes, 64, and the pivotal connection may be effected by a pin, 65, which extends through alined holes in the fork member and one of the holes in the lever, 63. One end of the lever, 63, is connected with the bar, 60, by means of a link, 66, the upper end of which is pivotally connected to the lever, 63, while the lower end may be pivotally connected to the bar by a pin extending through the end of the link and one of the holes, 61. The opposite end of the lever, 63, may be connected by the link, 67, with the actuating lever, 25.

From the description which I have given, the operation of this mechanism should be very readily understood. The motor, 40, drives the crank shaft, 47, through the belt, 52, pulley, 51, counter-shaft, 50, pinion, 49, and gear, 48. This causes a vertical reciprocation of the block, 54, and the pitman, 46, carried thereby, due to the connecting rod, 55, connecting the crank shaft and said block. The pitman is guided in the head, 45, and the block 54 is likewise mounted on the guides, 57, so that the block is compelled to move in a truly vertical direction. The reciprocation of the pitman, 55, rocks the lever, 63, upon its fulcrum at the upper end of the link, 66. The rocking movement of the lever, 63, is transmitted through the link, 67, to the actuating lever, 25, of the welding machine. Due to the automatic switch and the fact that the link, 67, is connected to the actuating lever of the welding machine instead of to the main lever, the welding circuit is closed automatically when the proper pressure is reached irrespective of the thickness of the work or the condition of the electrodes. This attachment renders the welding machine automatic, causing the upper electrode to move to and fro, so as to engage the work repeatedly and make repeated welds. In practice, the operator may move the work between welds, so as to cause the electrode to engage a new spot at its next stroke. If the movement of the work is considerable, the machine may operate simply to make repeated spot welds. In practice, we have found that this machine does seam welding in a very satisfactory manner. The operator simply moves the work a slight distance each time, so that a series of spot welds are produced which overlap each other. This forms a seam weld and has proven very desirable in welding stampings of irregular shape and form, and of such a character that this work could not be done on any seam welding machine with which I am familiar. This mechanism not only renders the spot welding machine automatic, but enables me to do electric seam welding in a large number of places, where it has been heretofore considered impossible.

I have found by experience that the mechanism disclosed will operate automatically to make satisfactory welds. On the other hand, I have tried various other mechanical arrangements for automatically imparting an oscillatory movement to the welding machine lever and have found it impossible to weld succesfully therewith. I believe that one of the reasons for the success of this particular machine is that there is sufficient play and lost motion in the connections between the parts, of the parts themselves, and sufficient give or resilience so that a dwell or continued pressure of the electrodes on the work is effected, as distinguished from an instantaneous and momentary pressure.

I am aware that the particular embodiment of my invention, which I have described in this specification, is susceptible of considerable variation without departing from the spirit of my invention, and, therefore, I desire to claim my invention broadly, as indicated by the appended claims.

Having thus described my invention, what I claim as new and desire to secure by Letters Patent is:—

1. In combination with a welding machine having relatively movable electrodes, an auxiliary attachment comprising a substantially vertically extending frame, a pitman having a reciprocatory movement in the upper portion of said frame, motor means located at the bottom of said frame for imparting movement to said pitman, and means connecting said pitman to the machine for operating the relatively movable electrodes.

2. A machine for continuously and automatically effecting a series of spot welds in rapid succession thereby constituting in effect a seam weld, comprising, in combination, a spot welding machine of the type having relatively movable electrodes together with means for automatically closing the welding circuit upon the application of a predetermined pressure upon the work between the electrodes, and a power driven portable attachment operatively connected to the welding machine, said operative connection being adapted to transmit movement from the power driven device to the welding electrodes, whereby the latter are automatically moved relatively to each other.

3. A machine for continuously and automatically effecting a series of spot welds in rapid succession thereby constituting in effect a seam weld comprising, in combination, a conventional spot welding machine and a power driven portable attachment therefor, capable of having its relative position varied with respect to the welding machine, said attachment including means for operatively connecting the same to the spot welding machine, said operative connection being adapted to transmit movement between the power driven device and the welding electrodes, whereby the latter are automatically moved relatively to each other.

4. A machine for continuously and automatically effecting a series of spot welds in rapid succession thereby constituting in effect a seam weld comprising, in combination, a conventional spot welding machine and a self-contained power driven portable attachment unit capable of having its relative position varied with respect to the welding machine operatively connected thereto, said unit including an elongated frame structure having driving means arranged at its base, adjustable operating connections between the unit and the spot welding machine, and driven means carried by said frame intermediate said drive means and said operating connections for transmitting movement from the drive means to such connections.

5. A machine for continuously and automatically effecting a series of spot welds in rapid succession thereby constituting in effect a seam weld comprising, in combination, a conventional spot welding machine and a power driven portable attachment therefor capable of having its relative position varied with respect to the welding machine, said attachment including adjustable means for operatively connecting the same to the spot welding machine for transmitting movement therefrom to the electrodes and for varying the characteristics of such movement.

In testimony whereof, I affix my signature.

JOSEPH LEDWINKA.